United States Patent [19]

Chen

[11] Patent Number: 4,727,114

[45] Date of Patent: Feb. 23, 1988

[54] CHLOROSULFONATED POLYETHYLENE BLENDS

[75] Inventor: John C. Chen, Hockessin, Del.

[73] Assignee: E. I. DuPont de Nemours and Company, Wilmington, Del.

[21] Appl. No.: 53,541

[22] Filed: May 26, 1987

Related U.S. Application Data

[63] Continuation-in-part of Ser. No. 900,608, Aug. 26, 1986, abandoned.

[51] Int. Cl.⁴ .................... C08L 23/34; C08L 27/06
[52] U.S. Cl. ................................ 525/239; 525/192
[58] Field of Search ........................ 525/239, 192

[56] References Cited

U.S. PATENT DOCUMENTS

| | | | |
|---|---|---|---|
| 2,956,980 | 10/1960 | Law | 260/45.5 |
| 3,006,889 | 10/1961 | Prey | 260/45.5 |
| 3,022,263 | 2/1962 | Orthner et al. | 260/45.5 |
| 3,209,055 | 9/1965 | Hedberg et al. | 260/897 |
| 4,280,940 | 7/1981 | Klug et al. | 260/23 |
| 4,556,694 | 12/1985 | Wallace | 525/239 |

Primary Examiner—Carman J. Seccuro

[57] ABSTRACT

It has been found that if two different chlorosulfonated polyethylenes, each with its own specific selected chlorine and sulfur content range, are blended with polyvinyl chloride, the resulting three-phase blend has good oil resistance and low temperature toughness.

3 Claims, No Drawings

CHLOROSULFONATED POLYETHYLENE BLENDS

This application is a continuation-in-part of application Ser. No. 900,608 filed 8/26/86, now abandoned.

BACKGROUND

This invention relates to polymeric blends of chlorosulfonated polyethylenes.

Chlorosulfonated polyethylenes are widely known and widely used commercially as elastomers in which the sulfonyl chloride moieties function as cross-linking or curing sites. They are resistant to ozone or oxygen degradation, and are generally solvent (oil) resistant. Chlorosulfonated polyethylenes are generally given the designation CSM in the industry.

It is known that the higher the chlorine content of a CSM the better the oil resistance, but as chlorine content increases, the glass transition temperature of the CSM increases thus making the polymer more brittle at low temperatures. In order to improve the mechanical properties and oil resistance, polyvinyl chloride has been blended with the CSM to reinforce the CSM elastomer and also to increase chlorine content of the overall blend (PVC has a chlorine content of 57 wt. % while CSM's have chlorine contents of 35-48 wt. % depending on the CSM).

However, blends of a CSM and PVC result in significantly degraded low temperature toughness, i.e., brittle point. And, in some cases, poor mechanical property retention results after submission in oil. For example, a CSM of 40 wt. % chlorine content blended with PVC had poor property retention after oil swell; and a CSM of 48 wt. % chlorine blended with PVC had poor low temperature toughness.

Chlorinated polyethylenes, because of the similar chemical composition, have very similar physical properties to CSM's of the same chlorine contents. The only important differences are the less versatile cure chemistry and the relatively higher residual crystallinity. Chlorinated polyethylenes are generally given the designation CPE in the industry.

SUMMARY OF THE INVENTION

It has now been discovered that two chlorosulfonated polyethylenes, one of high chlorine content and one of lower chlorine content, when mixed with polyvinyl chloride, result in a ternary blend that has good oil resistance and good low temperature toughness. The resulting three-phase blend has unexpectedly better oil resistance and low temperature toughness than blends of (1) polyvinyl chloride and only one chlorosulfonated polyethylene where its chlorine and sulfur content is between that of the two chlorosulfonated polyethylenes, (2) polyvinyl chloride and two chlorinated polyethylenes having chlorine contents approximately the same as those of the two chlorosulfonated polyethylenes or (3) polyvinyl chloride and one chlorosulfonated polyethylene and one chlorinated polyethylene (designated CPE) of equivalent chlorine and sulfur contents.

The reason for such results is not completely understood, but is believed to lie in the fact that a more gradual chlorine content difference and the specific interactions between the sulfonyl chloride groups of CSM and PVC facilitate the morphological stability which allows the synergistic combination of the good low temperature toughness of the lower chlorine content CSM and the good oil resistance of the higher chlorine content components. Because of the critical role of chlorine content to the mutual compatability between a CSM and PVC, the inclusion of an intermediate chlorine content CSM, e.g., 43% Cl and 1% S, provides a more gradual transition in the chlorine content difference which promotes the overall compatability of the blend system.

DESCRIPTION OF THE INVENTION

The polyvinyl chloride (PVC) used herein can be prepared by polymerizing vinyl chloride as described in the literature such as, for example, U.S. Pat. Nos. 2,381,388; 2,434,231; 2,491,494; or 2,624,718. While it is not essential, preferably the PVC will have an inherent viscosity of 0.6 to 0.85 as determined by ASTM 1243-66T (Method A).

The chlorosulfonated polyethylenes used herein can be made by chlorosulfonating polyethylene, which preferably has a base density of at least 0.92. The polyethylene may either be high density linear or low density polyethylene. Although it is preferable to use polyethylene homopolymer, the polyethylene may also contain a higher alpha-olefin comonomer such as butene-1 or octene-1 in amounts up to 10% by weight.

The chlorosulfonated polyethylene is prepared by chlorination of polyethylene in the presence of a chlorosulfonating agent such as sulfur dioxide. Alternatively, the chlorination and chlorosulfonation reactions may be conducted sequentially. Usually the chlorination and chlorosulfonation are conducted simultaneously at elevated temperatures, at about 60°-115° C., with gaseous chlorine or a chlorine-generating material, sulfur dioxide and/or sulfuryl chloride. The process can be carried out in a solvent inert to the reactants, or in a suspension in an inert nonsolvent, or without a solvent, all of which processes are known and described, for example in U.S. Pat. Nos. 3,759,888 and 3,347,835. Conventional free-radical initiators are commonly used, such as organic peroxides or aliphatic azo compounds. Suitable solvents include chlorinated solvents, aromatic hydrocarbons and, specifically, carbon tetrachloride, tetrachloroethane, chloroform, chlorobenzene and trifluorochloroethane, or mixtures thereof. Suspension chlorination is generally conducted in water.

The sulfonyl chloride groups introduced by these processes allow the polymer to be cured, if desired, usually with polybasic metal oxides, especially litharge (PbO), magnesium oxide, or polybasic metal salts of weak acids, such as tribasic lead maleate. The amount of sulfur in the form of sulfonyl chloride groups in the elastomer is from 0.2-5% by weight, usually about 1% by weight.

In the blend, one of the two chlorosulfonated polyethylenes will have a chlorine content of 40 to 52 wt. %, preferably 41-45 wt. %, and a sulfur content of 0.2 to 5 wt. %, preferably 1-2 wt. %. The other chlorosulfonated polyethylene will have a chlorine content of 24-40wt. %, preferably 29-36 wt. %, and a sulfur content of 0.2 to 5 wt. %, preferably 1-2 wt. %. The chlorine content of each of the two chlorosulfonated polyethylenes must differ by at least 5 wt. %. In the blends of this invention, each chlorosulfonated polyethylene is present in an amount of between 7.5 and 55 wt. %, and the polyvinyl chloride will be present in an amount of 30 to 70 wt. %. The total percent, of course, cannot be greater than 100%.

Mixing of the three ingredients can be accomplished by any convenient means, for example, by mill or internal mixer. The blend consists of three separate phases. The blends of the three components produce products of good oil resistance, good retention of properties after contact with oil, and good low temperature properties.

The blends may contain other additives such as thermal stabilizers, plasticizers, compatibilizers, surface release agents, fillers and the like.

The chlorosulfonated polyethylene/polyvinyl chloride blends of this invention are especially useful in the uncured compounded state as roofing film and pond and pit liners.

The following Examples illustrate the invention and the comparisons illustrate the selective nature of the invention. Amounts are given in parts by weight unless otherwise indicated.

In the Examples, the tests referred to therein were carried out as follows:

Volume Swell After Immersion in ASTM #3 Oil at 70° C. for 7 Days

The volume swell increase test method according to ASTM D-471 for determining physical changes in elastomeric compounds resulting from immersion in liquids was used. The specimens were immersed in ASTM No. 3 oil for 7 days at 70° C. Measurements of weight and volume were made before and after immersion in the test liquids. The volume swell was calculated based on the sample weight in air and in an alcohol and the density of the alcohol.

Solenoid Brittle Point

This test shows the low temperature toughness of the blends. It is carried out according to ASTM D-746.

EXAMPLE 1 AND COMPARATIVE EXAMPLE 1A

Example 1 and Comparative Example 1A compare a blend of PVC and two different chlorosulfonated polyethylenes (CSM hereafter) within the invention, with a blend of PVC and only one CSM. Thus, the comparison is between a blend of PVC/CSM-1/CSM-2 of the invention and a blend of PVC/CSM-3 (CSM-3 has chlorine content between the other two). The better volume swell numbers (lower) and the lower brittle test temperature values (better) in the blend of the invention are apparent.

EXAMPLE 1

A blend of 37.5 parts chlorosulfonated polyethylene having a chlorine content of 43 wt. %, a sulfur content of 1 wt. % and a Mooney viscosity of 7, 12.5 parts chlorosulfonated polyethylene having a chlorine content of 35 wt. %, a sulfur content of 1 wt. % and Mooney viscosity of 55 and 50 parts of a polyvinyl chloride having an inherent viscosity of 0.68 (ASTM D1243-66T Method A) Was prepared by mixing on a roll mill at 170° C. for 10 minutes into a uniform mixture. It is seen that the chlorine content of 43 wt. % in the first chlorosulfonated polyethylene is more than 5 wt. % higher than the 35 wt. % content in the second chlorosulfonated polyethylene. The blend also contained 3.75 parts "Lectro" 78 lead fumarate, 3.75 parts "Dyphos" lead phosphite, 0.5 parts "Loxiol" HOB 7121 pentaerythritol mono/distearate surface release agent, 0.5 parts calcium stearate and 1.5 parts low molecular weight polyethylene (40 cps Brookfield viscosity at 140° C.) surface release agent. The compounded stock was compression molded into 150×150×1.9 mm slabs at 160° C. for 3 minutes. The test specimens were died out of the slabs and tested for volume swell after immersion in ASTM #3 oil at 70° C. for seven days and for solenoid brittle point (ASTM D-746).

Results are shown in Table I.

COMPARATIVE EXAMPLE 1A

A sample of 50 parts of chlorosulfonated polyethylene having a chlorine content of 37.1 wt. %, a sulfur content of 1 wt. % and the base polyethylene comprising 75% polyethylene of 17.5 melt index and 25% polyethylene of 4.75 melt index was compounded with polyvinyl chloride, "Lectro" 78 lead fumarate, "Dyphos" lead phosphite, "Loxiol" HOB 7121 pentaerythritol mono/distearate surface release agent, calcium stearate and "PE 1702" low molecular weight polyethylene surface release agent in the same quantities and in the same manner as described in Example 1. Results of the volume swell and brittle point tests are shown in Table I.

TABLE I

| | Ex. 1 | Comp. Ex. 1A |
|---|---|---|
| Chlorosulfonated Polyethylene (43 wt. % Cl, 1 wt. % S) | 37.5 | — |
| Chlorosulfonated Polyethylene (35 wt. % Cl, 1 wt. % S) | 12.5 | — |
| Chlorosulfonated Polyethylene (37.1 wt. % Cl, 1 wt. % S) | — | 50 |
| Polyvinyl Chloride | 50 | 50 |
| Lead Fumarate | 3.75 | 3.75 |
| Lead Phosphite | 3.75 | 3.75 |
| Pentaerythritol Mono/distearate | 0.5 | 0.5 |
| Calcium Stearate | 0.5 | 0.5 |
| Polyethylene (40 cps Brookfield visc. at 140° C.) | 1.5 | 1.5 |
| Volume Swell After Immersion in ASTM #3 Oil at 70° C. for 7 Days | | |
| % Increase | 26.7 | 32.3 |
| Solenoid Brittle Point (ASTM D-746) | | |
| Passes, °C. | −35 | −10 |
| Fails, °C. | −40 | −15 |

EXAMPLE 2 AND COMPARATIVE EXAMPLE 2A

In this set of experiments, a blend of the invention, PVC/CSM-1/CSM-2 is compared with a blend of PVC/CSM/CPE where CPE is a chlorinated polyethylene. As seen, the Example 2 blend has better volume swell and brittle point.

EXAMPLE 2

A blend of 37.5 parts chlorosulfonated polyethylene having a chlorine content of 43 wt. %, a sulfur content of 1 wt. %, and a Mooney viscosity of 77, 12.5 parts chlorosulfonated polyethylene having a chlorine content of 35 wt. %, a sulfur content of 1 wt. % and Mooney viscosity of 55 and 50 parts of a polyvinyl chloride having an inherent viscosity of 0.68 (ASTM D1243-66T Method A) was prepared by mixing on a roll mill at 170° C. for 10 minutes into a uniform mixture. The blend also contained 3.75 parts "Lectro" 78 lead fumarate, 3.75 parts "Dyphos" lead phosphite, 0.5 parts "Loxiol" HOB 7121 pentaerythritol mono/distearate surface release agent, 0.5 parts calcium stearate and 1.5 parts low molecular weight polyethylene (40 cps Brookfield viscosity at 140° C.) surface release agent. The compounded stock was compression molded into 150×150×1.9 mm slabs at 160° C. for 3 minutes. The test specimens were died out of the slabs and tested for volume swell after immersion in ASTM #3 oil at 70° C. for seven days and for solenoid brittle point (ASTM D-746).

Results are shown in Table II.

COMPARATIVE EXAMPLE 2A

A blend of 37.5 parts chlorinated polyethylene having a chlorine content of 43 wt. % and a Mooney viscosity of 90, 12.5 parts chlorosulfonated polyethylene having a chlorine content of 35 wt. %, a sulfur content of 1 wt. % and a Mooney viscosity of 55 and 50 parts of polyvinyl chloride having an inherent viscosity of 0.68 (ASTM D1243-66T Method A) was compounded with "Lectro" 78 lead fumarate, "Dyphos" lead phosphite, "Loxiol" HOB 7121 pentaerythritol mono/distearate surface release agent, calcium stearate and "PE 1702" polyethylene surface release agent in the same quantities and in the same manner as described in Example 2. Results of the volume swell and brittle point tests are shown in Table II.

TABLE II

|  | Comp. Ex. 2 | Ex. 2A |
|---|---|---|
| Chlorosulfonated Polyethylene (43 wt. % Cl, 1 wt. % S) | 37.5 | — |
| Chlorosulfonated Polyethylene (35 wt. % Cl, 1 wt. % S) | 12.5 | 12.5 |
| Chlorinated Polyethylene (43 wt. % Cl) | — | 37.5 |
| Polyvinyl Chloride | 50 | 50 |
| Lead Fumarate | 3.75 | 3.75 |
| Lead Phosphite | 3.75 | 3.75 |
| Pentaerythritol Mono/distearate | 0.5 | 0.5 |
| Calcium Stearate | 0.5 | 0.5 |
| Polyethylene (40 cps Brookfield visc. at 140° C.) | 1.5 | 1.5 |
| Volume Swell After Immersion in ASTM #3 Oil at 70° C. for 7 Days | | |
| % Increase | 18.2 | 26.0 |
| Solenoid Brittle Point (ASTM D-746) | | |
| Passes, °C. | −40 | −35 |
| Fails, °C. | −45 | −40 |

EXAMPLE 3 AND COMPARATIVE EXAMPLE 3A

In this set of Experiments, a blend of the invention, PVC/CSM-1/CSM-2 is compared with a blend of PVC/CSM/CPE. The better volume swell (lower number) and lower brittle point in the blend of the invention are seen in Table III.

EXAMPLE 3

A blend of 25 parts chlorosulfonated polyethylene having a chlorine content of 43 wt. %, a sulfur content of 1 wt. %, and a Mooney viscosity of 77, 25 parts chlorosulfonated polyethylene having a chlorine content of 35 wt. %, a sulfur content of 1 wt. % and Mooney viscosity of 55 and 50 parts of a polyvinyl chloride having an inherent viscosity of 0.68 (ASTM D1243-66T Method A) was prepared by mixing on a roll mill at 170° C. for 10 minutes into a uniform mixture. The blend also contained 3.75 parts "Lectro" 78 lead fumarate, 3.75 parts "Dyphos" lead phosphite, 0 5 parts "Loxiol" HOB 7121 pentaerythritol mono/distearate surface release agent, 0.5 parts calcium stearate and 1.5 parts low molecular weight polyethylene (40 cps Brookfield viscosity at 140° C ) surface release agent. The compounded stock was compression molded into 150×150×1.9 mm slabs at 160° C. for 3 minutes. The test specimens were died out of the slabs and tested for volume swell after immersion in ASTM #3 oil at 70° C. for seven days and for solenoid brittle point (ASTM D-746).

Results are shown in Table III.

COMPARATIVE EXAMPLE 3A

A blend of 25 parts chlorinated polyethylene having a chlorine content of 43 wt. % and a Mooney viscosity of 90, 25 parts chlorosulfonated polyethylene having a chlorine content of 35 wt. %, a sulfur content of 1 wt. % and a Mooney viscosity of 55 and 50 parts of polyvinyl chloride having an inherent viscosity of 0.68 (ASTM D1243-66T Method A) was compounded with "Lectro" 78 lead fumarate, "Dyphos" lead phosphite, "Loxiol" HOB 7121 pentaerythritol mono/distearate surface release agent, calcium stearate and "PE 1702" polyethylene surface release agent in the same quantities and in the same manner as described in Example 3. Results of the volume swell and brittle point tests are shown in Table III.

TABLE III

|  | Ex. 3 | Comp. Ex. 3A |
|---|---|---|
| Chlorosulfonated Polyethylene (43 wt. % Cl, 1 wt. % S) | 25 | — |
| Chlorosulfonated Polyethylene (35 wt. % Cl, 1 wt. % S) | 25 | 25 |
| Chlorinated Polyethylene (43 wt. % Cl) | — | 25 |
| Polyvinyl Chloride | 50 | 50 |
| Lead Fumarate | 3.75 | 3.75 |
| Lead Phosphite | 3.75 | 3.75 |
| Pentaerythritol Mono/distearate | 0.5 | 0.5 |
| Calcium Stearate | 0.5 | 0.5 |
| Polyethylene (40 cps Brookfield visc. at 140° C.) | 1.5 | 1.5 |
| Volume Swell After Immersion in ASTM #3 Oil at 70° C. for 7 Days | | |
| % Increase | 28.2 | 35.4 |
| Solenoid Brittle Point (ASTM D-746) | | |
| Passes, °C. | −45 | −40 |
| Fails, °C. | −50 | −45 |

EXAMPLE 4 AND COMPARATIVE EXAMPLE 4A

In this set of experiments, a blend of the invention, PVC/CSM-1/CSM-2 is compared with a blend of PVC/CSM/CPE. The volume swell results are about the same and the brittle values are better for the comparison.

EXAMPLE 4

A blend of 12.5 parts chlorosulfonated polyethylene having a chlorine content of 43 wt. %, a sulfur contnet of 1 wt. % and a Mooney viscosity of 77, 37.5 parts chlorosulfonated polyethylene having a chlorine content of 35 wt. %, a sulfur content of 1 wt. % and Mooney viscosity of 55 and 50 parts of a polyvinyl chloride having an inherent viscosity of 0.68 (ASTM D1243-66T Method A) was prepared by mixing on a roll mill at 170° C. for 10 minutes into a uniform mixture. The blend also contained 3.75 parts "Lectro" 78 lead fumarate, 3.75 parts "Dyphos" lead phosphite, 0.5 parts "Loxiol" HOB 7121 pentaerythritol mono/distearate surface release agent, 0.5 parts calcium stearate and 1.5 parts low molecular weight polyethylene (40 cps Brookfield viscosity at 140° C.) surface release agent. The compounded stock was compression molded into 150×150×1.9 mm slabs at 160° C. for 3 minutes. The test speciments were died out of the slabs and tested for volume swell after immersion in ASTM #3 oil at 70° C. for seven days and for solenoid brittle point (ASTM D-746).

Results are shown in Table IV.

COMPARATIVE EXAMPLE 4A

A blend of 12.5 parts chlorinated polyethylene having a chlorine content of 43 wt. % and a Mooney viscosity of 90, 37.5 parts chlorosulfonated polyethylene having a chlorine content of 35 wt. %, a sulfur content of 1 wt. % and a Mooney viscosity of 55 and 50 parts of polyvinyl chloride having an inherent viscosity of 0.68 (ASTM D1243-66T Method A) was compounded with "Lectro" 78 lead fumarate, "Dyphos" lead phosphite, "Loxiol" HOB 7121 pentaerythritol mono/distearate surface release agent, calcium stearate and "PE 1702" polyethylene surface release agent in the same quantities and in the same manner as described in Example 4. Results of the volume swell and brittle point tests are shown in Table IV.

TABLE IV

|  | Ex. 4 | Comp. Ex. 4A |
|---|---|---|
| Chlorosulfonated Polyethylene (43 wt. % Cl, 1 wt. % S) | 12.5 | — |
| Chlorosulfonated Polyethylene (35 wt. % Cl, 1 wt. % S) | 37.5 | 37.5 |
| Chlorinated Polyethylene (43 wt. % Cl) | — | 12.5 |
| Polyvinyl Chloride | 50 | 50 |
| Lead Fumarate | 3.75 | 3.75 |
| Lead Phosphite | 3.75 | 3.75 |
| Pentaerythritol Mono/distearate | 0.5 | 0.5 |
| Calcium Stearate | 0.5 | 0.5 |
| Polyethylene (40 cps Brookfield visc. at 140° C.) | 1.5 | 1.5 |
| Volume Swell After Immersion in ASTM #3 Oil at 70° C. for 7 Days | | |
| % Increase | 42.9 | 42.4 |
| Solenoid Brittle Point (ASTM D-746) | | |
| Passes, °C. | −50 | −45 |
| Fails, °C. | −55 | −50 |

EXAMPLE 5 AND COMPARATIVE EXAMPLE 5A

In this set of experiments, a blend of the invention, PVC/CSM-1/CSM-2 is compared with a PVC blend containing two CPE polymers, PVC/CPE-1/CPE-2. The better results of the blend of the invention for volume swell are shown in Table V and the slightly better overall results for brittleness are shown.

EXAMPLE 5

A blend of 37.5 parts chlorosulfonated polyethylene having a chlorine content of 43 wt. %, a sulfur content of 1 wt. % and a Mooney viscosity of 77, 12.5 parts chlorosulfonated polyethylene having a chlorine content of 35 wt. %, a sulfur content of 1 wt. % and Mooney viscosity of 55 and 50 parts of a polyvinyl chloride having an inherent viscosity of 0.68 (ASTM D1243-66T Method A) was prepared by mixing on a roll mill at 170° C. for 10 minutes into a uniform mixture. The blend also contained 3.75 parts "Lectro" 78 lead fumarate, 3.75 parts "Dyphos" lead phosphite, 0.5 parts "Loxiol" HOB 7121 pentaerythritol mono/distearate surface release agent, 0.5 parts calcium stearate and 1.5 parts low molecular weight polyethylene (40 cps Brookfield viscosity at 140° C.) surface release agent. The compounded stock was compression molded into 150×150×1.9 mm slabs at 160° C. for 3 mintues. The test specimens were died out of the slabs and tested for volume swell after immersion in ASTM #3 oil at 70° C. for seven days and for solenoid brittle point (ASTM D-746).

Results are shown in Table V.

COMPARATIVE EXAMPLE 5A

A blend of 37.5 parts chlorinated polyethylene having a chlorine content of 43 wt. % and a Mooney viscosity of 90, 12.5 parts chlorinated polyethylene having a chlorine content of 35 wt. % and a Mooney viscosity of 40 and 50 parts of polyvinyl chloride having an inherent viscosity of 0.68 (ASTM D1243-66T Method A) Was compounded with "Lectro" 78 lead fumarate, "Dyphos" lead phosphite, "Loxiol" HOB 7121 pentaerythritol mono/distearate surface release agent, calcium stearate and "PE 1702" polyethylene surface release agent in the same quantities and in the same manner as described in Example 5. Results of the volume swell and brittle point tests are shown in Table V.

TABLE V

|  | Ex. 5 | Comp. Ex. 5A |
|---|---|---|
| Chlorosulfonated Polyethylene (43 wt. % Cl, 1 wt. % S) | 37.5 | — |
| Chlorosulfonated Polyethylene (35 wt. % Cl, 1 wt. % S) | 12.5 | — |
| Chlorinated Polyethylene (43 wt. % Cl) | — | 37.5 |
| Chlorinated Polyethylene (35 wt. % Cl) | — | 12.5 |
| Polyvinyl Chloride | 50 | 50 |
| Lead Fumarate | 3.75 | 3.75 |
| Lead Phosphite | 3.75 | 3.75 |
| Pentaerythritol Mono/distearate | 0.5 | 0.5 |
| Calcium Stearate | 0.5 | 0.5 |
| Polyethylene (40 cps Brookfield visc. at 140° C.) | 1.5 | 1.5 |
| Volume Swell After Immersion in ASTM #3 Oil at 70° C. for 7 Days | | |
| % Increase | 16.7 | 30.6 |
| Solenoid Brittle Point (ASTM D-746) | | |
| Passes, °C. | −40 | −40 |
| Fails, °C. | −45 | −45 |
| No. of Failures/10 Testpieces at | | |
| −40° C. | 5 | 4 |
| −45° C. | 6 | 10 |

EXAMPLE 6 AND COMPARATIVE EXAMPLE 6A

This set of experiments compares the same types of blends as in the Example 5 set but with different amounts of ingredients. Results are similar to those of the Example 5 set.

EXAMPLE 6

A blend of 25 parts chlorosulfonated polyethylene having a chlorine content of 43 wt. %, a sulfur content of 1 wt. % and a Mooney viscosity of 77, 25 parts chlorosulfonated polyethylene having a chlorine content of 35 wt. %, a sulfur content of 1 wt. % and Mooney viscosity of 55 and 50 parts of a polyvinyl chloride having an inherent viscosity of 0.68 (ASTM D1243-66T Method A) was prepared by mixing on a roll mill at 170° C. for 10 minutes into a uniform mixture. The blend also contained 3.75 parts "Lectro" 78 lead fumarate, 3.75 parts "Dyphos" lead phosphite, 0.5 parts "Loxiol" HOB 7121 pentaerythritol mono/distearate surface release agent, 0.5 parts calcium stearate and 1.5 parts low molecular weight polyethylene (40 cps Brookfield viscosity at 140° C.) surface release agent. The compounded stock was compression molded into 150×150×1.9 mm slabs at 160° C. for 3 minutes. The test specimens were died out of the slabs and tested for volume swell after immersion in ASTM #3 oil at 70° C. for seven days and for solenoid brittle point (ASTM D-746).

Results are shown in Table VI.

COMPARATIVE EXAMPLE 6A

A blend of 25 parts chlorinated polyethylene having a chlorine content of 43 wt. % and a Mooney viscosity of 90, 25 parts chlorinated polyethylene having a chlorine content of 35 wt. % and a Mooney viscosity of 40 and 50 parts of polyvinyl chloride having an inherent viscosity of 0.68 (ASTM D1243-66T Method A) was compounded with "Lectro" 78 lead fumarate, "Dyphos" lead phosphite, "Loxiol" HOB 7121 pentaerythritol mono/distearate surface release agent, calcium stearate and "PE 1702" polyethylene surface release agent in the same quantities and in the same manner as described in Example 6. Results of the volume swell and brittle point tests are shown in Table VI.

TABLE VI

| | Ex. 6 | Comp. Ex. 6A |
|---|---|---|
| Chlorosulfonated Polyethylene (43 wt. % Cl, 1 wt. % S) | 25 | — |
| Chlorosulfonated Polyethylene (35 wt. % Cl, 1 wt. % S) | 25 | — |
| Chlorinated Polyethylene (43 wt. % Cl) | — | 25 |
| Chlorinated Polyethylene (35 wt. % Cl) | — | 25 |
| Polyvinyl Chloride | 50 | 50 |
| Lead Fumarate | 3.75 | 3.75 |
| Lead Phosphite | 3.75 | 3.75 |
| Pentaerythritol Mono/distearate | 0.5 | 0.5 |
| Calcium Stearate | 0.5 | 0.5 |
| Polyethylene (40 cps Brookfield visc. at 140° C.) | 1.5 | 1.5 |
| Volume Swell After Immersion in ASTM #3 Oil at 70° C. for 7 Days | | |
| % Increase | 27.6 | 47.8 |
| Solenoid Brittle Point (ASTM D-746) | | |
| Passes, °C. | −40 | −40 |
| Fails, °C. | −45 | −45 |
| No. of Failures/10 Testpieces at | | |
| −40° C. | 2 | 3 |
| −45° C. | 6 | 10 |

EXAMPLE 7 AND COMPARATIVE EXAMPLE 7A

This set of experiments uses different amounts of ingredients than in the Example 5 and 6 sets. Better volume swell values for the Example 7 blend are apparent from Table VII as is better brittle point results.

EXAMPLE 7

A blend of 12.5 parts chlorosulfonated polyethylene having a chlorine content of 43 wt. %, a sulfur content of 1 wt. % and a Mooney viscosity of 77, 37.5 parts chlorosulfonated polyethylene having a chlorine content of 35 wt. %, a sulfur content of 1 wt. % and Mooney viscosity of 55 and 50 parts of a polyvinyl chloride having an inherent viscosity of 0.68 (ASTM D1243-66T Method A) Was prepared by mixing on a roll mill at 170° C. for 10 minutes into a uniform mixture. The blend also contained 3.75 parts "Lectro" 78 lead fumarate, 3.75 parts "Dyphos" lead phosphite, 0.5 parts "Loxiol" HOB 7121 pentaerythritol ono/distearate surface release agent, 0.5 parts calcium stearate and 1.5 parts low molecular weight polyethylene (40 cps Brookfield viscosity at 140° C.) surface release agent. The compounded stock was compression molded into 150×150×1.9 mm slabs at 60° C. for 3 minutes. The test specimens were died out of the slabs and tested for volume swell after immersion in ASTM #3 oil at 70° C. for seven days and for solenoid brittle point (ASTM D-746).

Results are shown in Table VII.

COMPARATIVE EXAMPLE 7A

A blend of 12.5 parts chlorinated polyethylene having a chlorine content of 43 wt. % and a Mooney viscosity of 90, 37.5 parts chlorinated polyethylene having a chlorine content of 35 wt. % and a Mooney viscosity of 40 and 50 parts of polyvinyl chloride having an inherent viscosity of 0.68 (ASTM D1243-66T Method A) was compounded with "Lectro" 78 lead fumarate, "Dyphos" lead phosphite, "Loxiol" HOB 7121 pentaerythritol mono/distearate surface release agent, calcium stearate and "PE 1702" polyethylene surface release agent in the same quantities and in the same manner as described in Example 7. Results of the volume swell and brittle point tests are shown in Table VII.

TABLE VII

| | Ex. 7 | Comp. Ex. 7A |
|---|---|---|
| Chlorosulfonated Polyethylene (43 wt. % Cl, 1 wt. % S) | 12.5 | — |
| Chlorosulfonated Polyethylene (35 wt. % Cl, 1 wt. % S) | 37.5 | — |
| Chlorinated Polyethylene (43 wt. % Cl) | — | 12.5 |
| Chlorinated Polyethylene (35 wt. % Cl) | — | 37.5 |
| Polyvinyl Chloride | 50 | 50 |
| Lead Fumarate | 3.75 | 3.75 |
| Lead Phosphite | 3.75 | 3.75 |
| Pentaerythritol Mono/distearate | 0.5 | 0.5 |
| Calcium Stearate | 0.5 | 0.5 |
| Polyethylene (40 cps Brookfield visc. at 140° C.) | 1.5 | 1.5 |
| Volume Swell After Immersion in ASTM #3 Oil at 70° C. for 7 Days | | |
| % Increase | 34.2 | 63.7 |
| Solenoid Brittle Point (ASTM D-746) | | |
| Passes, °C. | −60 | −35 |
| Fails, °C. | −65 | −40 |
| No. of Failures/10 Testpieces at | | |
| −40° C. | 0 | 10 |
| −45° C. | 0 | 10 |

I claim:
1. A blend comprising a mixture of
 (a) 30–70 weight percent of (a), (b) and (c) of polyvinyl chloride,
 (b) 7.5–55 weight percent of (a), (b) and (c) of a chlorosulfonated polyethylene having a chlorine content of 40–52 weight percent and a sulfur content of 0.2–5 weight percent in the polymer, and
 (c) 7.5–55 weight percent of (a), (b) and (c) of a chlorosulfonated polyethylene having a chlorine content of 24–40 weight percent and a sulfur content of

0.2–5 weight percent in the polymer; with the proviso that the chlorine content of the chlorosulfonated polyethylene of components (b) and (c) differs by at least 5 weight percent.

2. The blend of claim 1 wherein the amount of component (b) present is between 12 and 37 weight percent and the amount of component (c) present is between 12 and 37 weight percent.

3. The blend of claim 2 wherein the chlorine content of the chlorosulfonated polyethylene of component (b) is between 41–45 weight percent in the polymer, and the chlorine content of the chlorosulfonated polyethylene of component (c) is between 29–36 weight percent in the polymer.

* * * * *